Dec. 15, 1970   E. W. SMITH   3,546,946
FLUID SAMPLE SELECTOR

Filed Jan. 8, 1969   8 Sheets-Sheet 1

INVENTOR.
EDWIN W. SMITH
BY
Woodhams, Blanchard & Flynn
ATTORNEYS

Dec. 15, 1970  E. W. SMITH  3,546,946
FLUID SAMPLE SELECTOR
Filed Jan. 8, 1969  8 Sheets-Sheet 6

INVENTOR.
EDWIN W. SMITH
BY
Woodhams, Blanchard & Flynn
ATTORNEYS

Dec. 15, 1970  E. W. SMITH  3,546,946
FLUID SAMPLE SELECTOR
Filed Jan. 8, 1969  8 Sheets-Sheet 7

INVENTOR.
EDWIN W. SMITH
BY
Woodhams, Blanchard & Flynn
ATTORNEYS

INVENTOR.
EDWIN W. SMITH
BY
Woodhams, Blanchard & Flynn
ATTORNEYS

United States Patent Office 3,546,946
Patented Dec. 15, 1970

3,546,946
FLUID SAMPLE SELECTOR
Edwin W. Smith, Climax Township, Kalamazoo County, Mich., assignor to The Upjohn Company, Kalamazoo, Mich., a corporation of Delaware
Filed Jan. 8, 1969, Ser. No. 789,722
Int. Cl. G01n 1/14
U.S. Cl. 73—423                           12 Claims

ABSTRACT OF THE DISCLOSURE

A rack that holds a plurality of containers, holding fluid specimens to be automatically tested, moves the containers sequentially into and out of a sampling position. A wash tank is mounted on the frame and spaced horizontally from the sampling position. A carriage, mounted on the frame, holds a probe holder that moves a probe substantially vertically between first and second positions above the sampling position and the wash tank, respectively. The movements of the probe by the carriage and the probe holder are substantially within a single plane.

FIELD OF THE INVENTION

This invention relates in general to a fluid sample selector and, more particularly, relates to an apparatus for selectively and repetitively moving a tubular probe in a predetermined manner between a first position wherein the probe is cleaned and a second position wherein the probe is brought into contact with a fluid test sample held in the lower part of a vertically elongated container. Preferably, the container is one of many which are supported by a rack which is part of the apparatus and which intermittently moves said containers, one at a time, into and out of a location where the probe can enter each container as the probe moves into said second position.

BACKGROUND OF THE INVENTION

Previously known devices for moving the end of a tubular probe into a vial containing a liquid test sample have supported the probe for movement in an arcuate path. As a result, in order to get the probe into the vial containing the test sample, it has been necessary to use a shallow vial so that the probe could pass over the lip thereof and still reach the liquid in the lower part of the vial. However, shallow vials have proven unsatisfactory from a lab technician's viewpoint for many types of tests. For example, when a blood sample was submitted to the lab for testing purposes, it was and still is necessary first to centrifuge the sample to separate the clot from the serum.

Previously, after centrifuging the sample, the lab technician then carefully poured the serum out of the test tube into a shallow vial so that a plurality of these shallow vials could be placed on a carrier or rack of an existing apparatus for removing the sample from the vial. The rack was thereafter moved so that the probe (having a limited range of sampling depth) could move successively into said vials and withdraw the serum from one shallow vial at a time and present each sample separately to a serum analyzer.

When the serum was being poured from the test tube into the vials, portions of the serum could accidentally spill out of the small vials or the test tube. Moreover, the samples could become confused during the transfer so that the test results were inaccurate or mistaken.

Accordingly, the need became apparent for a sampling apparatus which would eliminate the step of transferring the serum and the clot to a separate container after centrifuging, but still permitting the plurality of test samples to be placed onto a carrier for reception of a probe operated automatically by the apparatus. Also, it would be advantageous to use in the apparatus the same container into which the blood sample was drawn from the patient.

Efforts were made to utilize the existing apparatus, which supported the probe for arcuate movement, with the elongated test tubes, that is, the same type of test tubes utilized for centrifuging the test sample. However, the probe was unable to reach the test serum located near the bottom of the tube due to the arcuate movement of the probe. Specifically, the probe would contact the sidewalls of the test tube prior to reaching the test serum. Thus, the need for apparatus which would permit the probe to fully enter elongated test vials, wherein the test sample is located near the bottom thereof, became apparent.

Accordingly, it is an object of this invention to provide a fluid sample selector having means for supporting an elongated test tube or a similar container in a selected position and means supporting a hollow probe for movement into and out of said tube without contacting the sides thereof, adapted to permit removal of a test sample from the bottom of the tube.

It is a further object of this invention to provide a fluid sample selector having probe-supporting means, as aforesaid, wherein the probe is adjustably engaged so that the depth to which the probe extends into the test tube may be accurately controlled whereby the fluid sample selector can, for example, withdraw the serum without disturbing the clot when the test sample is centrifuged blood.

It is a further object of the invention to provide a fluid sample selector having sample containing means and a carrier therefor whereby the transfer or movement of said containing means away from said carrier means is reduced, by comparison with prior equipment for the same purpose, between the time the sample is taken from the patient to the time that it is tested.

It is a further object of this invention to provide a fluid sample selector having probe-supporting means, as aforesaid, by which the time during which the probe remains in the test tube is variable to permit same to be utilized for a wide variety of tests.

It is a further object of this invention to provide a fluid sample selector having probe-supporting means, as aforesaid, which can be used in cooperation with means supporting a plurality of tubes, each tube being moved intermittently and successively into and out of a location wherein the probe can be inserted into each tube in said location to remove a sample therefrom.

It is a further object of this invention to provide a test probe carriage having a relatively large vertical stroke.

It is a further object of this invention to provide a fluid sample selector which is easy to clean and maintain.

Other objects and purposes of this invention will be apparent to persons acquainted with apparatus of this general type upon reading the following specification and insecting the accompanying drawings, in which:

FIG. 11 is a sectional view taken along the line XI—XI of FIG. 9;

Figure 1:
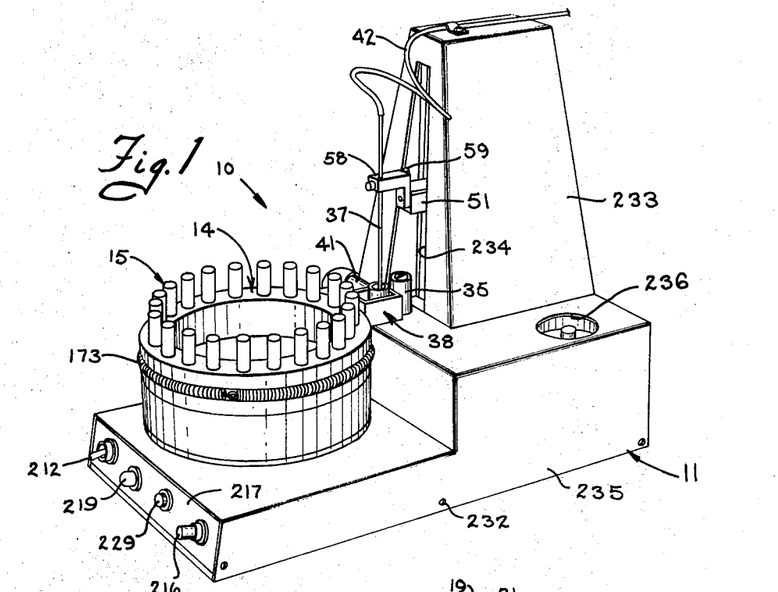
FIG. 1 is a perspective view of a fluid sample selector embodying the invention.

For convenience in reference, the terms "front," "rear," "up," "down," "right" and "left" will refer to the apparatus of the invention and parts thereof as appearing in FIG. 1 wherein the front side faces leftwardly. The words "in" and "out" will refer to directions toward and away from, respectively, the geometric center of the device and designated parts thereof. Said terminology will include the words above specifically mentioned, derivatives thereof, and words of similar import.

SUMMARY OF THE INVENTION

The objects and purposes of the invention are met by providing an apparatus having a frame supporting a device for engaging a tubular probe and moving it in a predetermined pattern between first and second positions, and having a rack for holding a plurality of elongated containers in which liquid test samples are placed. Drive means moves the rack so that the containers are moved to a sampling position along a path intersecting the first position of the probe. Indexing means associated with the drive means controls the movement of the rack whereby each container is moved, one at a time, into and out of the location of the intersection in said path wherein said probe can enter the container as it moves into the sampling position to withdraw the liquid test sample. The probe is normally cleaned after removal from each container.

DETAILED DESCRIPTION

Figures 3, 4, 4A, 4B:
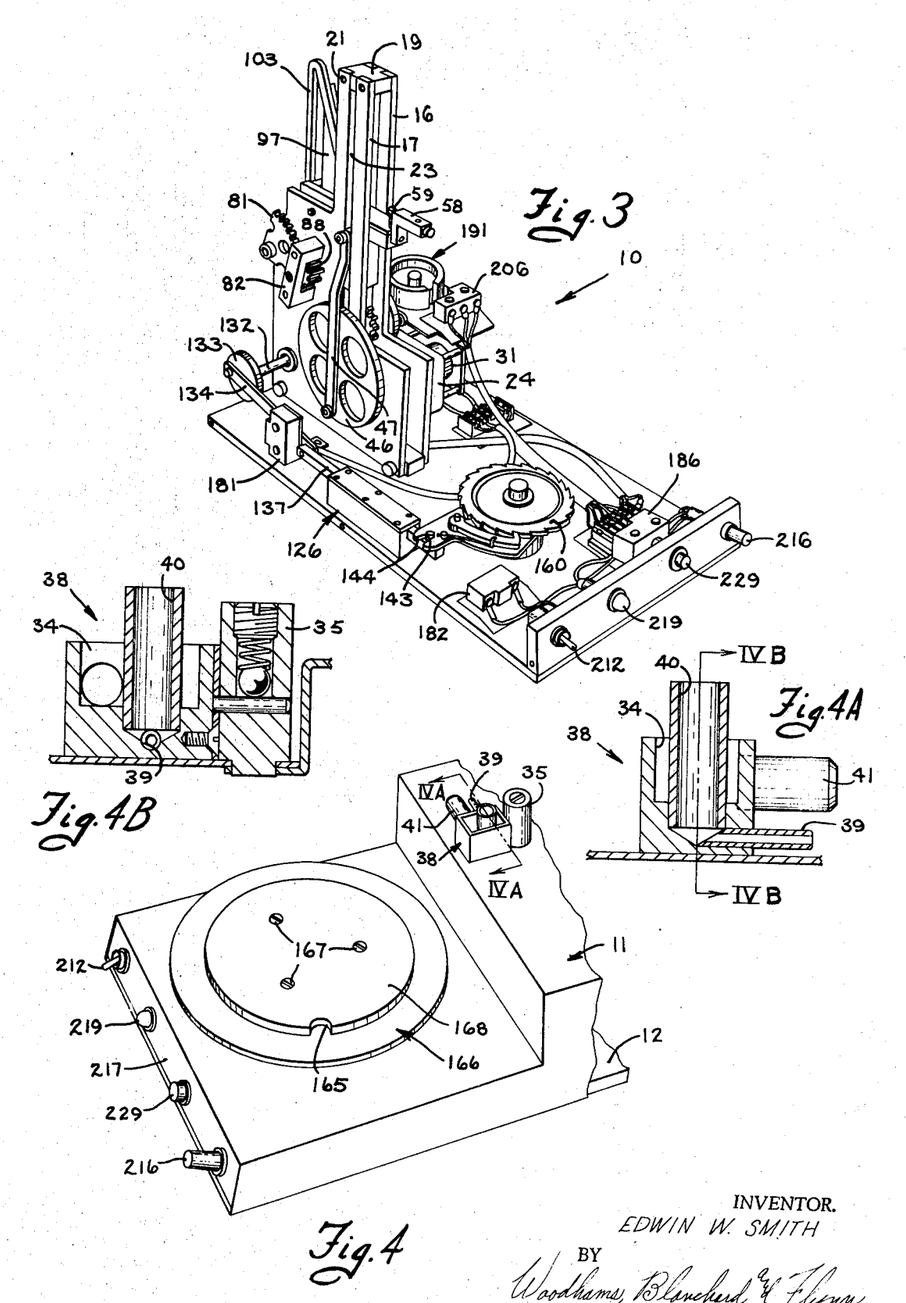
FIG. 3 is another perspective view of the selector illustrated in FIG. 2 taken on a different angle.
FIG. 4 is a fragmentary perspective view of a portion of the fluid sample selector illustrated in FIG. 1.
FIG. 4A is a sectional elevation taken along the line IVA—IVA of FIG. 4.
FIG. 4B is a sectional elevation taken along the line IVB—IVB of FIG. 4A.

The fluid sample selector apparatus 10 (FIG. 1) comprises an outer casing 11 which is removably secured to the base plate 12 (FIG. 4) and which covers substantially all of the elements of the selector apparatus mounted on frame members secured to said base plate. The apparatus 10 includes a rack 14 for holding test sample containers, and a device for supporting and moving a tubular probe 37.

Figures 9, 10:
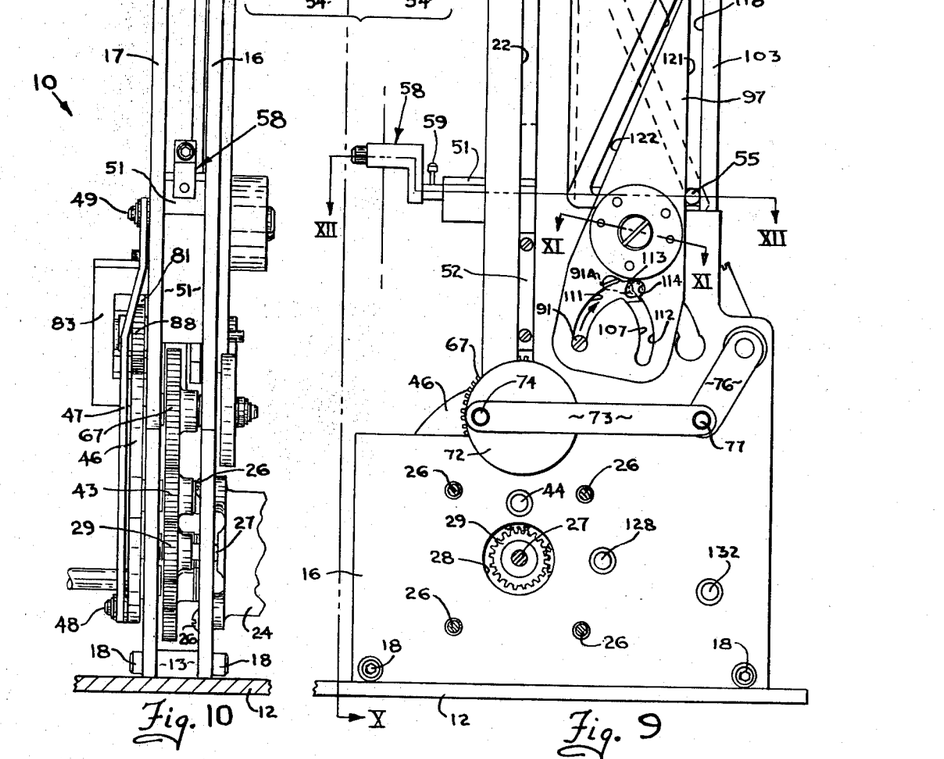
FIG. 9 is a side elevational view of the fragment of the fluid sample selector illustrated in FIG. 6 as seen from the opposite side thereof.
FIG. 10 is a fragmentary sectional elevation taken along the line X—X in FIG. 9.

An elongated bar 13 (FIGS. 10 and 14) is secured to the base plate 12 near the rear end thereof, and said bar extends frontwardly parallel with the side edges of the base plate 12. A pair of side plates 16 and 17 are secured to the longitudinal sides of the bar 13 by a plurality of screws 18 (FIG. 10). The plates 16 and 17 extend vertically upwardly from the base plate 12 and are spaced apart a distance equal to the width of the elongated bar 13. A brace 19 is secured between the upper ends of the plates 16 and 17 by a plurality of screws 21 to maintain a selected spacing therebetween and to rigidify the structure.

Plates 16 and 17 (FIGS. 9 and 6) have vertically elongated slots 22 and 23, respectively, which are transversely aligned and extend from the upper edges of the plates to locations spaced upwardly from the base plate 12.

Figure 2:
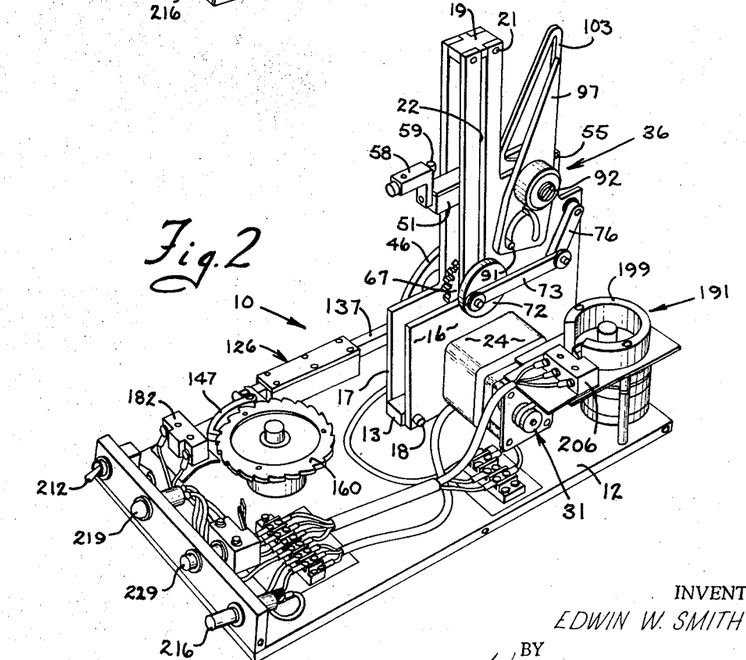
FIG. 2 is a perspective view of the fluid sample selector illustrated in FIG. 1, the outer casing being removed therefrom to show the parts.

A drive motor 24 (FIG. 2) is secured to the right side of the plate 16 directly below the slot 22 by a plurality of screws 26 (FIG. 9). The drive motor has a shaft 27 which extends through an opening 28 in the plate 16 and is secured to a drive gear 29 positioned between the plates 16 and 17. The motor 24 is provided with a brake 31 (FIG. 2) to precisely stop the motor and prevent it from coasting after it has been de-energized. When the motor 24 is energized, the brake 31 is simultaneously released to permit the shaft 27 and drive gear 29 to rotate.

PROBE CONTROL DEVICE

The probe control device 36 (FIG. 2) includes mechanism for moving the probe 37 between a first position within a test sample container 15 held in the rack or carrier 14 (FIG. 1) and a second position in the wash tank 38. The details of the synchronized movement of the probe 37 and the rack 14 will be discussed hereinafter in the section entitled "Carrier Drive Mechanism."

The probe 37 is of a tubular construction and has a flexible hose 42 secured to the upper end thereof, which hose is connected to a suction pump (not shown) for removing the test sample disposed in the containers 15 and moving it to a sample analyzer, not illustrated.

The wash tank 38 (FIGS. 4A and 4B) has an outer well 34 which is supported upon the casing 11 and communicates with an outlet pipe 41. An inner well 40 is disposed within the outer well 34 and communicates with an inlet pipe 39. The inlet pipe 39 can be connected to a source of cleaning or wash liquid, such as water, under pressure which flows upwardly through the well 40 and spills into the outer well 34. Because the inner well extends substantially above the outer well, the liquid in the inner well cannot be contaminated by any residue which may collect in the outer tank. The outlet pipe is connected to any convenient exhaust device (not shown).

The outer well is preferably releasably connected to a post 35 which is in turn secured to the casing 11. Thus, the tank 38 can be easily removed from the casing for cleaning or replacement after a batch of samples have been tested.

Referring now to the drive mechanism for the probe 37, a gear 43 (FIG. 16) is rotatably supported on a shaft 44 journaled in the plates 16 and 17 and is in a meshing engagement with the drive gear 29. The shaft 44 (FIG. 16) extends beyond the plate 16 and a wheel 46 is secured to the extension and is rotatable therewith. In this particular embodiment, the number of teeth on the gears 29 and 43 are identical so that they will provide a 1 to 1 ratio therebetween. One end of a pitman 47 (FIG. 6) is pivotally secured by a pin 48 to the outer periphery of the wheel 46. The other end of the pitman 47 is secured by a pin 49 to a carriage 51 (FIG. 10).

Figures 14, 15, 16:
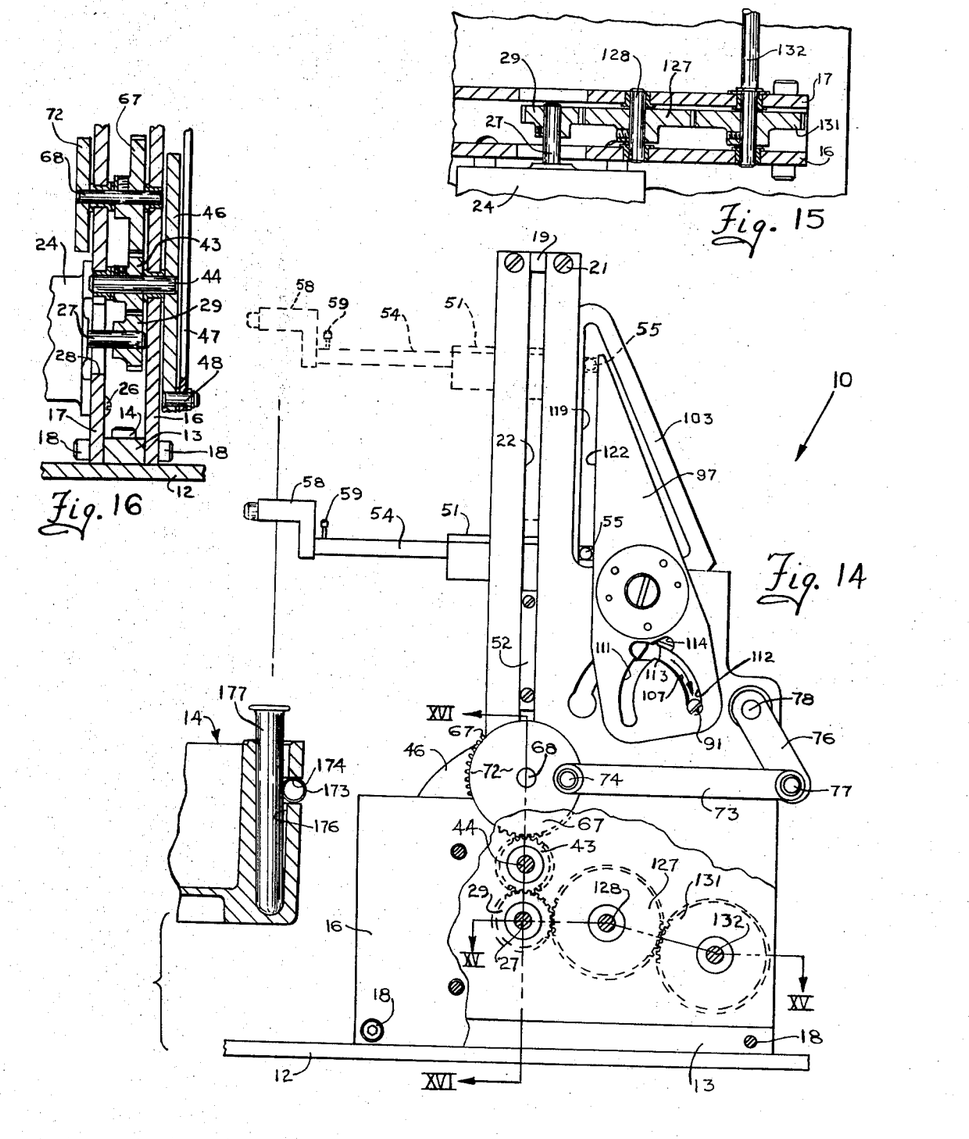
FIG. 14 is a broken side elevational view of the part of the fluid sample selector appearing in FIG. 9.
FIG. 15 is a sectional view taken along the line XV—XV of FIG. 14.
FIG. 16 is a sectional view taken along the line XVI—XVI of FIG. 14.

The carriage 51 has a pair of projections, one of which is illustrated at 52 in FIG. 14, which project into the slots 22 and 23 in the plates 16 and 17, respectively, to guide vertical movement of the carriage 51. Rotation of the wheel 46 causes the carriage 51 to be driven alternately upwardly and downwardly.

Figures 12, 13:
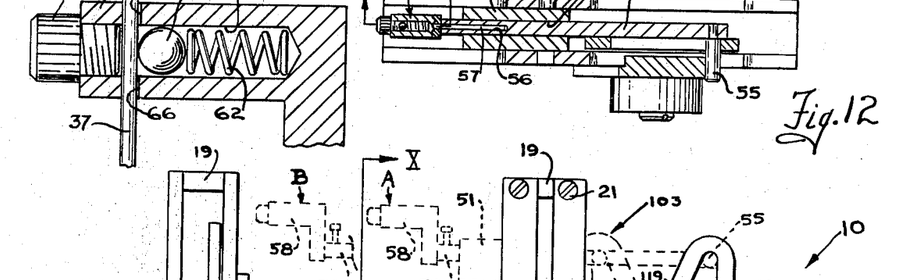
FIG. 12 is a sectional view taken along the line XII—XII of FIG. 9.
FIG. 13 is a sectional view taken along the line XIII—XIII of FIG. 12.

The carriage 51 (FIG. 12) has a horizontal opening 53 in which a rod 54 is axially slideably disposed for movement between positions A and B illustrated in FIG. 9. A pin 55 (FIG. 12) is secured to the rearward end of the rod 54 and projects sidewardly therefrom.

The forward end of the rod 54 has a recess 56 (FIG. 12) which slideably receives a pin 57 to which the L-shaped probe holder 58 is secured at the front end thereof. The holder 58 is axially movable and rotatable with respect to the rod 54. A thumb screw 59 extends through the rod 54 and is adapted to adjustably engage pin 57 in the recess 56 in rod 54 and thereby to prevent relative movement therebetween.

The holder 58 has a recess 60 (FIG. 13) in the front end thereof, which houses a ball 61 and a spring 62. A plug 63 is threaded into the front end of the recess 60 to contain the ball 61 and hold the spring 62 under compression. A pair of axially aligned openings 64 and 66 are provided in the holder 58 close to but spaced from the plug 63. In the preferred embodiment, the center lines of the openings 64 and 66 are positioned between the inner end of the plug 63 and a vertical line passing through the center of the ball 61 when same is engaged with said end of the plug 63. The probe 37 is received through the openings 64 and 66 and is held therein by frictional engagement thereof with the walls of the openings 64 and 66 against which it is urged by the ball 61 and the spring 62. Thus, probe 37 can be adjusted vertically to any desired position as well as removed therefrom merely by manually overcoming the frictional force. In this particular embodiment, the openings 64 and 66 are sufficiently large that they can receive probes of various dimeters. The front part of the probe holder 58 is offset upwardly thus permitting the use of a longer probe, hence a deeper tube 15 than would be otherwise possible. This offset may be omitted, if not required.

A gear 67 (FIG. 16) is secured to a shaft 68 which is journaled in the plates 16 and 17 and which projects beyond the plate 17 where a wheel 72 is secured thereto and is rotatable therewith. The gear 67 is in meshing engagement with the gear 43 at a 2 to 1 ratio.

One end of a connecting rod 73 is pivotally secured to the wheel 72 by a pin 74 (FIG. 14), and the opposite end of the rod 73 is pivotally connected to one end of a crank 76 by a pin 77. The other end of the crank 76 is secured to a shaft 78 which is journaled in the plates 16 and 17. The throw of the crank 76 and the distance between the center lines of the pin 74 and wheel 72 are such that a full revolution of the wheel 72 will oscillate the crank 76 through an arc of about 60 degrees. The shaft 78 (FIGS. 6 and 7) projects outwardly of the plate 17 and has a gear segment 81 secured thereto for oscillation therewith.

A bearing support 82 (FIG. 7) is mounted upon the wall 17 by a pair of screws 84 (FIG. 6) and supports a bearing 83 which is spaced from the wall 17. A shaft 86 is rotatably journaled in the bearing 83 and in a bearing 87 mounted in the plate 17. A gear 88 is secured to the shaft 86 between the plate 17 and support 82, and is in meshing engagement with the gear 81. The shaft 86 extends into the zone between the plates 16 and 17 (FIG. 7) where a wheel 89 is secured thereto and rotatable therewith. A pin 91 is secured to the wheel 89 near the periphery thereof so that it extends through and beyond an arcuate opening 90 (FIG. 8) in the plate 16. The purpose of this construction will be discussed hereinafter.

In this particular embodiment, the gear segment 81 has a 3 to 1 ratio with the gears 29 and 43, gear 67 is in a 2 to 1 ratio with gear 43, and gear 88 is in a 1 to 1 ratio with the gears 29 and 43. Thus, one complete revolution of the drive gear 29 will result in one complete revolution of the gear 43 and wheel 46. The gear 67 will simultaneously rotate 180 degrees which will cause the gear segment 81 to oscillate 60 degrees and thereby rotate the gear 88 180 degrees.

A screw 92 (FIG. 11) projects through an opening 93 in the plate 16 and is threadedly held in the opening 94 of the plate 17. The screw 92 projects outwardly of the plate 16, and a hub 96 is rotatably journaled thereon. The hub 96 has a cam plate 97 secured thereto and movable therewith. A plurality of openings 98 each extend through the hub 96 and the cam plate 97 to receive a spring 99 and a ball 101. The balls 101 are urged into detent recesses 102 (FIGS. 8 and 11) in the plate 16 by the springs 99 and serve to locate the cam plate 97 during a particular movement thereof and prevent same from moving to another location until urged to do so by other mechanisms which will be discussed in detail hereinbelow.

Figures 6, 7, 7A, 8:
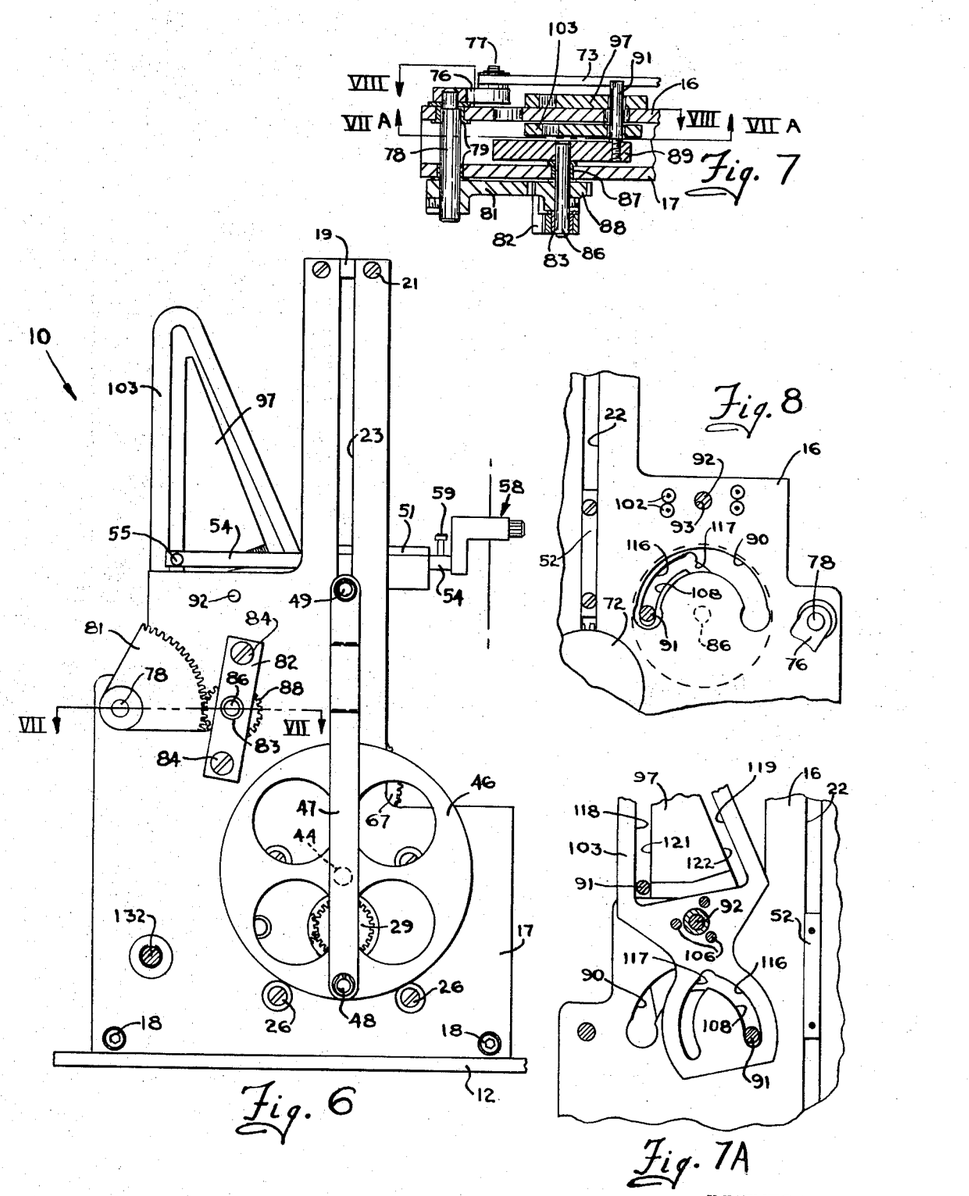
FIG. 6 is a side elevation of a fragment of the fluid sample selector.
FIG. 7 is a sectional view taken along the line VII—VII of FIG. 6.
FIG. 7A is a sectional view taken along the line VIIA—VIIA of FIG. 7.
FIG. 8 is a sectional view taken along the line VIII—VIII of FIG. 7 and rotated 180 degrees.

A cam element 103 (FIG. 11) is secured to a hub 104 by at least one screw 106, and the hub 104 is rotatably journaled on the screw 92 between the plates 16 and 17. The cam plate 97 and cam element 103 have elongated arcuate slots 107 and 108, respectively, as shown in FIGS. 9, 8 and 7A. More particularly, the arcuate slot 107 in the cam plate 97 (FIG. 9), comprises a pair of slot segment 111 has its center of curvature coaxial with the axis radius of curvature as the arcuate opening 90 in the plate 16 (FIG. 8). However, slot segments 111 and 112 have different centers on the cam plate 97. That is, when the cam plate 97 is in its position of FIG. 9, the slot segment 111 has its center of curvature coaxial with the axis of the wheel 89. Thus, if the wheel 89 is rotated, the pin 91 carried by the wheel 89 will be able to move in the direction indicated by the arrow in FIG. 9 along the slot 111 to the position indicated in dotted lines at 91A.

The cam element 103 has a pair of arcuate slot segments 116 and 117 (FIG. 7A) which are similar in shape and arrangement to the slot segments 111 and 112. The center of curvature of the slot segment 116 is coaxial with the center of the wheel 89 when the cam element 103 is in the position illustrated in solid lines in FIG. 9. The center of curvature of the slot segment 117 is coaxial with the axis of the wheel 89 when the cam element 103 has moved to the position illustrated in FIG. 14.

The cam element 103 has a pair of upwardly converging cam surfaces 118 and 119, the rear cam surface 118 being vertical and the front cam surface 119 being inclined to the vertical when element 103 is in the position illustrated in solid lines in FIG. 9. The cam plate 97 has cam surfaces 121 and 122 which converge upwardly, preferably at the same angle of convergence as the cam surfaces 118 and 119. However, the transverse distance between points on the surfaces 121 and 122 on the same radius is preferably less than the distance between corresponding points on the cam surfaces 118 and 119 on said same radius by an amount somewhat greater than the diameter of the pin 55 which extends through the opening defined by the surfaces 118 and 119 at least to a point where said pin can firmly engage the cam surfaces 121 and 122.

Thus, the surface 118 on the cam element 103 and the surface 121 of the cam plate 97 will guide the pin 55 as it moves vertically therebetween as the result of rotation of the wheel 46. As the pin 55 reaches the upper end of the surface 118, the pin 91 secured to the wheel 89 will engage the cam element 103 at 113 and thereby pivot the element 103 about the screw 92 into the broken line position illustrated in FIG. 9. Accordingly, the surface 119 on the camming element 103 will be vertical (FIG. 14) and the surface 122 on the cam plate 97 will be parallel thereto but spaced rearwardly of the surface 119 a distance slightly greater than the diameter of the pin 55 on the rod 54. Thus, the surfaces 119 and 122 will guide the pin 55 vertically upon an appropriate rotation of the wheel 46.

CARRIER DRIVE MECHANISM

The carrier drive mechanism 126 for synchronously moving the carrier 14 in timed sequence with the movement of the probe 37 is illustrated in FIGS. 3, 5, 14 and 15. A gear 127 (FIG. 14) is secured to a shaft 128, which is journaled in the plates 16 and 17. The gear 127 is in meshing engagement with the drive gear 29. A gear 131 is secured to and rotatable with shaft 132 which is rotabably journaled in the plates 16 and 17. The gear 131 is in meshing engagement with the gear 127. In this particular embodiment, the gears 127 and 29 have a 2 to 1 ratio and the gears 127 and 131 have a 1 to 1 ratio.

The shaft 132 extends outwardly beyond the plate 17 (FIG. 5) and has a crank wheel 133 secured to and rotatable with the outer end thereof. A pitman 134 is secured to the crank wheel 133 by a pin 136 near the periphery thereof. The opposite end of the pitman 134 is pivotally secured to a bar 137 by a pin 138.

A guide block 139 is secured to the base plate 12 by a plurality of screws 141. The guide block 139 has a horizontal opening 142 (FIG. 17) therethrough in which the bar 137 is slideably received.

A limit switch 181 (FIG. 5) is secured to the base plate 12 by a plurality of screws 183 and is positioned so that the rearward end of the bar 137 will actuate said switch at the rearward end of the stroke. A limit switch 182 is secured to the base plate 12 by a plurality of screws 184 at the forward end of the bar 137 and said switch is positioned so that the bar 137 will actuate same at the forward end of the stroke.

A pin 143 projects upwardly from the forward end of the bar 137 and is received into a recess 144 in the outer end of a lever plate 146. A hub 153 is secured to the base plate 12 by a plurality of screws one of which is shown at 150 in FIG. 17. Lever plate 146 is pivotally supported at its inner end upon the hub 153. A pawl 147 (FIG. 5) is pivotally secured to the lever plate 146 by a pin 148, and a spring 149 resiliently engages the pawl 147 whereby the hook 162 on the outer end of the pawl is urged toward the axis of hub 153.

Figure 5:
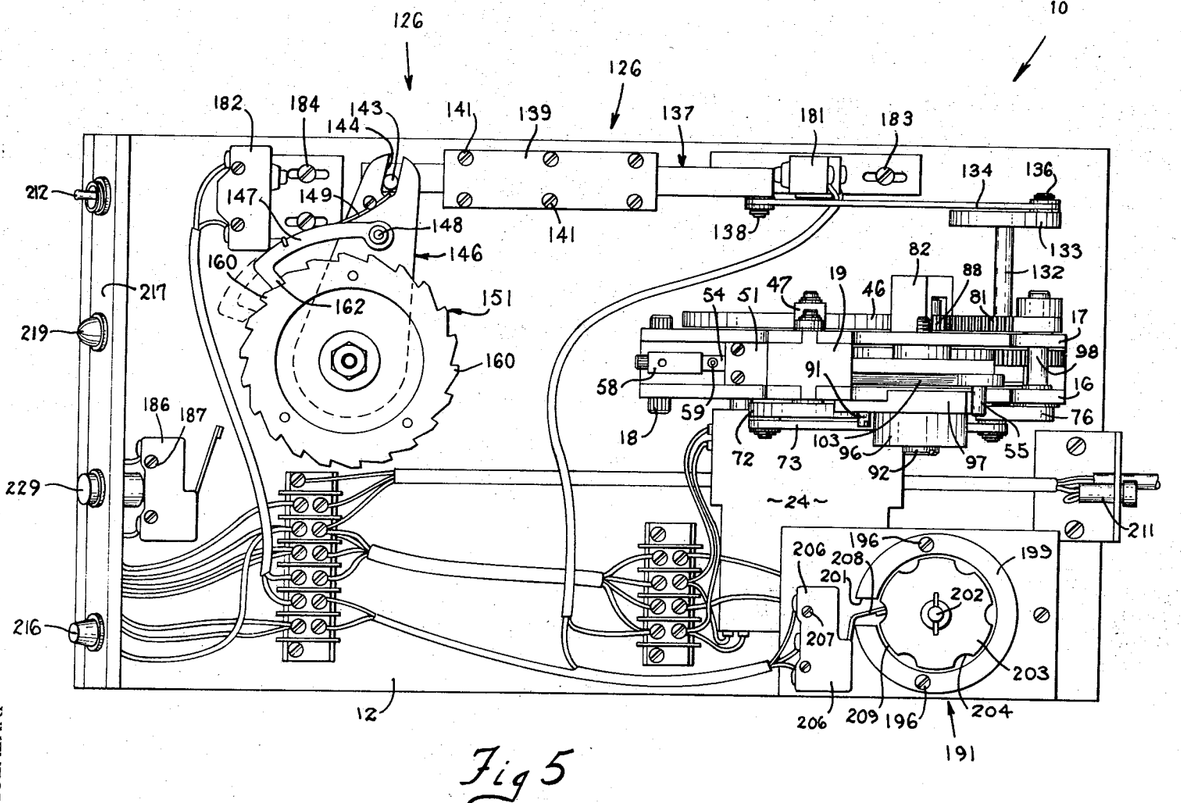
FIG. 5 is a plan view of the fluid sample selector, the outer casing being removed therefrom.

A ratchet wheel 151 is supported for rotation about a shaft 152 which is coaxially mounted on and extends upwardly from the hub 153. A bushing 154 (FIG. 17) is provided between the shaft 152 and the ratchet wheel 151 to facilitate a smooth and easy rotation thereof. The spring 149 resiliently urges the pawl hook 162 into engagement with the teeth 160 on the ratchet wheel 151 (FIG. 5).

Figures 19, 21:
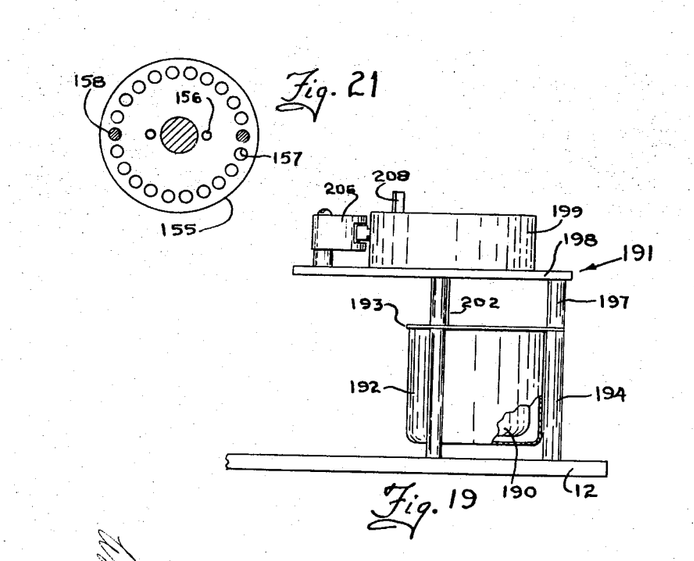
FIG. 19 is a side elevation of the timing motor.
FIG. 21 is a sectional view taken along the line XXI—XXI of FIG. 17.

In this particular embodiment, a circular indexing plate 155 (FIGS. 17 and 21) is secured to the hub 153 between the ratchet wheel 151 and the lever plate 146 by a plurality of pins 156. The plate 155 has a plurality of detent openings 157 arranged in a circle concentric with and adjacent to the periphery of said plate 155. The ratchet wheel 151 (FIG. 17) has at least two diametrically disposed openings 163 in which balls 158 are disposed. The centers of the openings 157 in plate 155 and the centers of the openings 163 in ratchet wheel 151 are preferably equidistant from the axis of hub 153. A resilient leaf spring 159 is secured by a nut 161 to the shaft 152 directly above ratchet wheel 151 and resiliently urges the balls 158 into the smaller, upper ends of the dent openings 157 in the indexing plate 155 to thereby releasably hold the ratchet wheel in one of several selected positions with respect to the plate 155.

Figure 17:
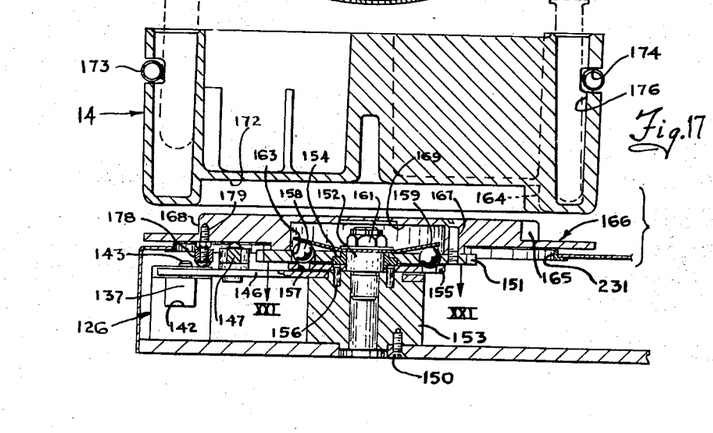
FIG. 17 is a central sectional elevation of a test sample container carrying rack.
Figure 18:
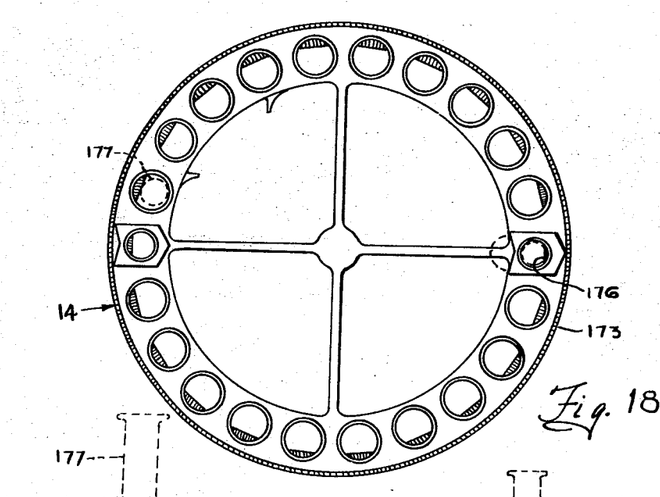
FIG. 18 is a top view of the test sample container rack.

A turntable 166 (FIG. 4) is secured to the upper surface of the ratchet wheel 151 by a plurality of screws 167. The turntable 166 has a central raised portion 168 with a downwardly opening recess 169 in which the spring 159 is disposed (FIG. 17). The cylindrical carrier 14 has a recess 172 in the lower wall thereof, which receives the raised portion 168 of the turntable 166 to center the carrier 14 relative to the hub 153. A key 164, which extends into the recess 172, is provided on the lower wall of the carrier to be received into the slot 165 in the raised portion 168.

The cylindrical carrier 14 (FIG. 17) has a plurality of upwardly opening pockets arranged in a circle adjacent the periphery of the carrier for receiving containers or tubes 177. A coiled spring 173 is disposed in an annular notch 174 which encircles the carrier 14 near the top thereof. The annular notch 174 communicates with each of the pockets 176 so that the spring normally extends into each pocket. Thus, a tube 177 in a pocket 176 will expand the coiled spring 173 so that the test tube will be gripped thereby to prevent the tube from moving in the pocket 176, especially when the bottom of the tube is spaced from the bottom of its pocket 176.

A lug 178 is secured to the underside of the turntable 166 by a screw 179 near the periphery of the turntable and is in a predetermined position relative to the slot 165.

A limit switch 186 (FIG. 5) is secured to the base plate 12 by a plurality of screws 187 and is positioned so that it will be opened once per revolution of the carrier 14 by the lug 178. The switch 186 is located so that the initial tube station on the carrier 14 will be directly below the first or outer position of the probe when the switch is opened and the sequence of sampling is completed. However, this final positioning of the carrier will be effected as the probe returns to the wash or second position. The switch 186 is closed by the manual reset button 229 (FIG. 22) to initiate another sequence of sampling cycles.

TIMING MECHANISM

Figure 20:
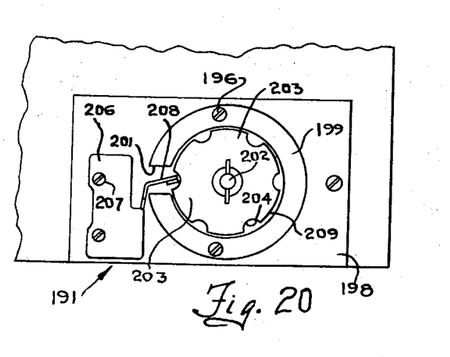
FIG. 20 is a plan view of the timing cam.

A timing mechanism 191 (FIGS. 5, 19 and 20) comprises a motor 190 disposed in a motor housing 192 having an annular flange 193 engaged by mounting posts 194 secured to the base plate 12. The posts 194 have extensions 197 above the flange 193 which support a plate 198 above the motor housing 192. The plate 198 has a split ring member 199 secured to the upper surface thereof by the screws 196. The ring member 199 has a slot 201 in the wall thereof.

The motor 190 has a shaft 202 (FIG. 20) which projects upwardly through the plate 198 into the central portion of the ring member 199. A cam element 203, which is driven by the shaft 202 and is rotatable therewith, has a plurality of spaced recesses 204 in the periphery thereof, which separate the lands 209. The shaft 202, in this particular embodiment, rotates at a relatively slow speed, such as about one-third of a revolution per minute.

A limit switch 206 is secured by a plurality of screws 207 to the upper surface of the plate 198 and has an actuating element 208 extending through the slot 201 in the ring member 199 for engagement by the periphery of the cam element 203.

ELECTRICAL SYSTEM

Figure 22:
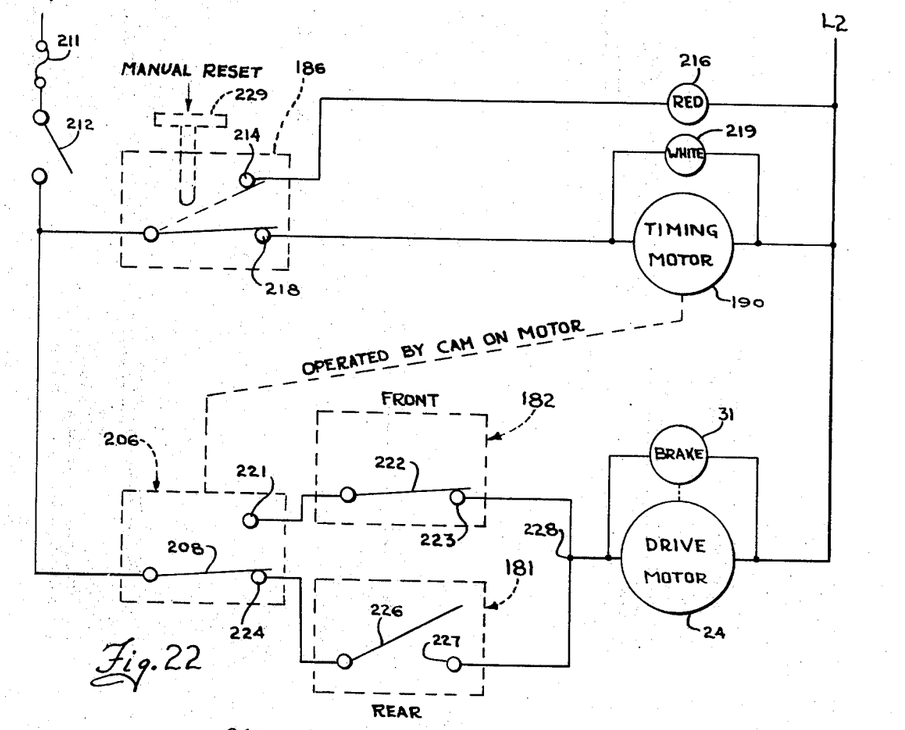
FIG. 22 is an electrical schematic of the various operative elements associated with the fluid sample selector.

The electrical system for the fluid sample selector device 10, as illustrated in FIG. 22, is supplied with electrical power, preferably 110 volts, and 60 cycles per second, through the lines L1 and L2. The input power may be fused at 211 and controlled by a switch 212 which is secured to the front panel 217 (FIG. 1) of the selector device 10. The positions of the armatures of the limit switches 181 and 182 are responsive to the position of the bolt 137 illustrated in FIG. 5. The limit switches 182, 186 and 206 are shown in their normally closed positions. The limit switch 181 is moved to the open position by the bolt 137.

The limit switches 186 and 206 are connected in parallel between lines L1 and L2. The terminal 214 of the limit switch 186 is connected through a red light 216 mounted on the front panel 217 to the line L2. The terminal 218 is connected through the timing motor 190 to the line L2. A white light 219 secured to the front panel 217 is connected in parallel with the timing motor 190.

The terminal 221 of the limit switch 206 is connected to the armature 222 of the limit switch 182. The terminal 223 of the limit switch 182 is connected through the drive motor 24 to the line L2. The brake 31 is connected in parallel with the drive motor 24 and its operation is simultaneous with the energization and de-energization of the drive motor.

The terminal 224 of the limit switch 206 is connected to the armature 226 of the limit switch 181. The terminal 227 of the limit switch 181 is connected to the terminal 223 of the limit switch 182 at the junction point 228.

A manual reset switch 229 is mounted on the front panel 217 and controls the limit switch 186 and serves to manually close the switch 186 when same is opened by the lug 178 on the carrier turntable 166.

All of the foregoing described mechanisms, except for the turntable 166 and carrier 14 are enclosed by the casing 11, which is secured to the base plate 12 by a plurality of screws 232. The casing has an upper housing 233 which has a frontwardly facing vertically elongated slot 234 therein through which projects the forwardmost portion of the carriage 51 (FIG. 1). The lower housing 235 of the casing 11 has an opening 236 in the upper surface thereof which is axially aligned with the ring member 199 and cam element 203. This structure facilitates the easy removal of the cam element 203 and its replacement with another cam element to change the timing of the device. Lower housing 235 also has an opening 231 (FIG. 17) through which the shaft 152 and associated parts extend.

OPERATION

Although the operation of the sample selector 10 will be apparent to persons of ordinary skill in this field upon reading the foregoing description and examing the attached drawings, such operation will now be summarized.

It will be assumed for purposes of discussion that the probe 37 is in the position illustrated in FIG. 1 with the lower end thereof positioned within the wash tank 38 so that water will be drawn into the probe 37 and into the tube 42 for purging the analyzer system. It will be further assumed that the bolt 137 is in the position illustrated in FIG. 5 and the armatures of the limit switches 181, 182, 186 and 206 are in the positions illustrated in FIG. 22. It will be further assumed that the cam element 203 is in the position illustrated in FIG. 20 with the actuating element in a recess 204. Thus, a closing of the switch 212 will energize the timing motor 190 and the light 219 through the limit switch 186 which has been closed by the manual reset button 229. The drive motor 24 will not be energized due to the opened limit switch 181. Energization of the timing motor 190 will cause the cam 203 (FIG. 20) to rotate clockwise so that one of the lands 209 will engage the actuating element 208 to move same to the terminal 221. This will simultaneously energize the drive motor 24 and de-energize the brake 31 so that the shaft 27 thereof and the drive gear 29 secured thereto will be rotated.

When the drive motor 24 is energized, a number of movements occur simultaneously. The wheel 46 will be rotated by the engagement of the gear 43 with the gear 29. Since the effective diameter of the wheel 46 is considerably larger than the diameter of the gears 29 and 43, the periphery of wheel 46 will move relatively rapidly. One-half of a revolution of the gear 29 will move the wheel 46 one-half of a revolution, thereby moving the pin 48 from its FIG. 6 position to its top position, not illustrated. This will cause a corresponding upward movement of the carriage 51. The pin 55 will be guided between the surfaces 118 and 121 on the cam element 103 and cam plate 97, respectively, to the dotted line position illustrated in FIG. 9.

Simultaneously with the half rotation of the wheel 46, the wheel 72 will be driven one-fourth of a revolution, due to the 2 to 1 gear ratio between the gears 67 and 43. The connecting rod 73 will be driven by the wheel 72 to pivot the crank 76 and thereby rotate the shaft 78 and gear segment 81 about 30 degrees or one-twelfth of a revolution. Since there is a 3 to 1 gear ratio between gears 81 and 88, the gear 88 will be driven one-fourth of a revolution by the 30 degree movement of the gear 81. This will cause the pin 91 (FIG. 9) to move in the direction of the arrow in the arcuate slot 111 from its solid line position almost to its dotted line position 91A. The pin 91 will, accordingly, strike the cam element 103 at 113 to cause same to pivot about the shaft 92 to the dotted line position illustrated in FIG. 9 and to move the rod 54, pin 55 and holder 58 from position A to position B. Movement of the rod 54 between positions A and B will be permitted by sliding of the rod 54 within the opening 53 in the carriage 51.

A continued rotation of wheel 72, hence movement of the pin 91, will subsequently cause pin 91 to strike the cam plate 97 at 114 to cause the cam plate 97 to pivot about the shaft 92 to the position illustrated in FIG. 14. When the cam plate 97 has reached the position illustrated in FIG. 14, the pin 48 on the wheel 46 will have moved slightly past the uppermost position so that the carriage will have moved from the uppermost position in FIG. 9 to a position slightly below the uppermost position, as illustrated in FIG. 14. Thus, when the cam plate moves forwardly to the position illustrated in FIG. 14 under the urgence of the pin 91, the pin 55 on the rod 54 will serve to limit the forward movement of the cam plate 97. Since the arcuate slot segments 112 and 117 are now aligned with the arcuate opening 92 in the plate 16, a continued movement of the wheel 89 and pin 91 will not affect the positioning of the cam plate 97 and cam element 103. The balls 101 (FIG. 11) will move from one set of detent recesses to the other to resiliently hold the cam plate 97 in the position illustrated.

Simultaneously therewith, the pin 48 on the wheel 46 will move back to the position illustrated in FIG. 6 causing the probe 37 and carriage 51 to move from the dotted line position illustrated in FIG. 14 to the solid line position. This movement will cause the lower end of the probe 37 to be placed within a test tube 177 located in the carrier 14.

Simultaneously with the foregoing discussion, one complete revolution of the drive gear 29 will cause one-half revolution of the gears 127 and 131. This, in turn, will produce one-half of a rotation of the wheel 133 (FIG. 5) which will cause the bolt 137 to move from the rearwardmost position to the forwardmost position so that the forwardmost end thereof will operate the limit switch 182. As the rearwardmost end of the bolt 137 moves away from the limit switch 181, the armature 226 thereof will move to the closed position. The bolt 137 will continue to move in a forward direction until the forwardmost end thereof opens the limit switch 182 and de-energizes the drive motor 24 and energizes the brake 31 to immediately stop the rotation of the drive motor and prevent it from coasting beyond the desired position. When the bolt 137 moves to the forwardmost position, the pin 143 will rotate the lever 146 about the hub 153 to move the pawl 147 to the position illustrated in dotted lines in FIG. 5 wherein the pawl 147 will be spaced from a tooth 160 on the ratchet wheel 151.

With the probe 37 in the position illustrated in solid lines in FIG 14, the test sample may be removed from the tube and drawn into a sample analyzer (not shown). Simultaneously with the foregoing, the timing motor 190 will continue to operate until the land 209 thereon has moved past the actuating element 208 so that it can drop into a recess 204, thereby causing the limit switch 206 to close the connection between the line 213 and the terminal 224 in a preferred timed sequence with the position of the probe 37 in the test tube. Thus, the drive motor 24 will again be energized through the limit switches 206 and 181 and the brake 31 will be released.

Energization of the drive motor 24 will cause the drive gear 29 to drive the gears 127 and 131 and the wheel 133 to move the bolt 137 rearwardly away from the limit switch 182, whereby the limit switch 182 is closed. However, since the limit switch 206 provides a connection between the lines 213 and the terminal 224, closing of the limit switch 182 will not cause any additional function to occur at this time. As the bolt 137 moves rearwardly, the pawl 137 will move clockwise until it comes into engagement with a tooth 160 on the ratchet wheel 151. However, since there is a 1 to 1 relationship between the drive gear 29 and the wheel 46, the pin 48 on the wheel 46 will have caused the carriage 51 to move rapidly upwardly to remove the lower end of the probe 37 from the test tube 177. Thus, the probe 37 will be completely removed from the test tube 177 prior to an engagement of the pawl 147 with a tooth 160 on the ratchet wheel 151. A continued rearward movement of the bolt 137 will cause an advancement of the ratchet wheel 151 one index position to place a new test tube 177 in alignment with the position of the probe when in the FIG. 14 position.

Simultaneously therewith, the drive gear 29 will drive the gear 67 through the gear 43 to cause the wheel 72 to move from the FIG. 14 position toward the FIG. 9 position. This will cause an opposite movement of the pin 91 in the arcuate slot segments 112 and 117. Simultaneously with the pin 55 reaching the uppermost point of travel, the pin 91 will strike the cam element 103 and cam plate 97 to cause same to move from the FIG. 14 position back to the starting position illustrated in solid lines in FIG. 9. Thereafter, the pin 48 on the wheel 46 will move from the uppermost point of travel downwardly to the starting position illustrated in FIG. 6. This will cause a corresponding movement of the carriage 51 from the position illustrated in dotted lines in FIG. 9 to the position illustrated in solid lines.

When the probe has reached the position illustrated in solid lines in FIG. 9, the bolt 137 (FIG. 5) will have reached the rearwardmost point of travel and initiate an actuation of the limit switch 181. This actuation will cause the limit switch 181 to open and thereby disconnect the drive motor 24 and energize the brake 31 to prevent the motor 24 from coasting.

The fluid sample selector device will remain in the stopped position until the cam element 203 on the timing motor 190 has moved clockwise in a predetermined amount of time to a position where the armature 208 of the limit switch 206 comes into engagement with the land 209 after which time the above-discussed operation will be repeated.

The carrier drive mechanism 126 will continue to advance and index the carrier 14, starting with the initial station on the carrier and advancing through one station at a time, until the lug 178 comes into engagement with the armature on the limit switch 186. This will occur after all of the stations in the carrier 14 have been placed one at a time in a position for entry by the probe 37 and the carrier has been indexed to the initial station again. Engagement of the lug 178 with the actuating element of the limit switch 186 will cause the armature to move from the terminal 218 to the terminal 214 to de-energize the timing motor 190 and the light 219 and simultaneously energize the light 216. In this particular embodiment, the light 216 has a red lens to indicate to the operator that the fluid sample selector device has completed the task of sampling all of the test vials and is ready for a new batch. The operator can then remove the carrier 14 containing the tested samples from the turntable 166 and replace it with another carrier with a new batch of samples. A closing of the reset switch button 229 will energize the timing motor 190 and light 219 so that the above discussed operation will be repeated.

The modified carrier 240 (FIG. 23) has a cylindrical base portion 241 with integral and intersecting webs 242 and 243 preferably extending between diametrically opposed portions of the cylinder. The base portion has a plurality of upwardly opening tube pockets 244, and said webs extend above the upper ends of said pockets.

Figure 23:
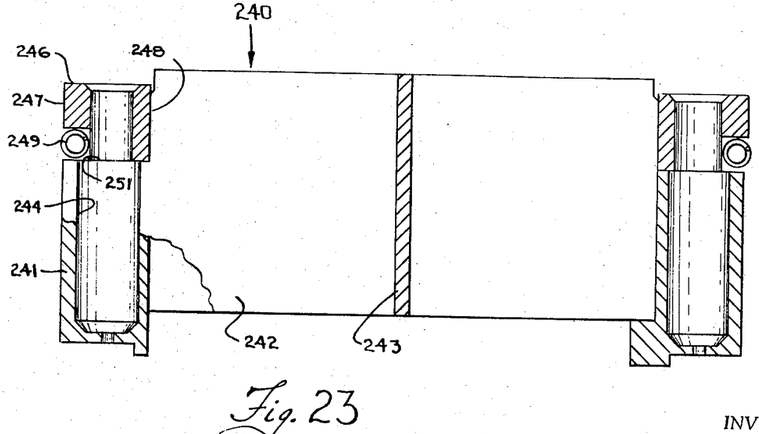
FIG. 23 is a broken central cross section of a modified carrier.

The carrier 240 also includes a ring 246 having tube openings 247 which are equal in number to, and axially alignable with, the tube pockets 244. The ring 246 has a central opening 248 approximately equal in diameter to the diametrical length of either of the webs 242 and 243 so that the ring 246 can slide over the webs and be held thereby in a selected position on the base portion 241. A coiled spring 249 is removably disposed under tension in the annular groove 251 in the ring 246 for holding the tubes in the desired position with respect thereto. Key means (not shown) assures a predetermined location of the ring 246 upon the base portion 241.

Although particular preferred embodiments of the invention have been disclosed above in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for automatically removing fluid specimens from a plurality of containers presented sequentially to a sampling position, comprising:
   frame means;
   rack means mounted on the frame means and adapted to hold said containers for movement into and out of said sampling position;
   carriage means mounted upon said frame means for vertical movement;
   probe-washing means mounted on said frame means and spaced horizontally from said sampling position;
   probe-holding means supported on said carriage means and movable horizontally along a substantially straight line with respect to said carriage means;
   hollow probe means supported by said probe-holding means and movable thereby between first and second positions above said sampling position and said washing means, respectively; and
   drive means connected to said carriage means and to said probe-holding means for effecting and controlling said vertical and horizontal movements thereof, whereby said probe means is moved substantially vertically into and out of said washing means and a container disposed in said sampling position, and the movements of said probe by said carriage means and said probe-holding means are substantially within a single plane.

2. An apparatus according to claim 1, wherein said containers are arranged in a circle on said rack means; and
   wherein said drive means is connected to said rack means for effecting rotation thereof around the axis of said circle, the movement of said rack means being synchronized with the movement of said probe means between said sampling position and said washing means.

3. An apparatus according to claim 1, wherein said probe-washing means comprises outer, upwardly opening well means connected to a discharge pipe, and inner, upwardly opening well means mounted in said outer well means and connected to a liquid supply pipe, said inner well means extending above said outer well means and being spaced from the sidewalls thereof, said inlet pipe being connected to a source of washing liquid under pressure, whereby said liquid will spill over the upper edge of said inner well into said outer well.

4. An apparatus according to claim 1, wherein said probe-holding means includes an elongated rod horizontally slideably supported by said carriage means and an L-shaped probe-engaging head mounted upon said rod means, said head having a vertical opening therethrough for receiving said probe means and spring-biased detent means for releasably holding said probe means in a selected position within said opening and with respect to said head.

5. An apparatus according to claim 1, wherein said frame means includes a pair of upright members; and
   guide means mounted upon and between said carriage means and said upright members for controlling the vertical movement of said carriage means.

6. An apparatus according to claim 1, wherein said probe means moves in a substantially rectangular path.

7. An apparatus for automatically removing fluid specimens from a plurality of containers presented sequentially to a sampling position, comprising:

frame means having a pair of upright members;

rack means mounted on said frame means and adapted to hold said containers for movement into and out of said sampling position;

carriage means mounted upon said frame means for vertical movement;

guide means mounted upon and between said carriage means and said upright members for controlling the vertical movement of said carriage means;

probe-washing means mounted on said frame means and spaced horizontally from said sampling position;

probe-holding means supported on said carriage means and movable horizontally with respect to said carriage means;

hollow probe means supported by said probe-holding means and movable thereby between first and second positions above said sampling position and said washing means, respectively;

drive means connected to said carriage means and said probe-holding means for effecting and controlling said vertical and horizontal movements thereof, whereby said probe means is moved substantially vertically into and out of said washing means and a container disposed in said sampling position, said drive means further including motor means mounted on said frame means, and gear means and linkage means connected between said motor means and said carriage means for effecting said vertical movement of said carriage means, said drive means further including cam means connected between said linkage means and said probe-holding means for effecting said horizontal movement of said probe-holding means when and only when said carriage means is substantially at the top of its vertical movement.

8. An apparatus according to claim 7, wherein said drive means includes second linkage means and second gear means connected between the first-mentioned gear means and said rack means for effecting said movement of said containers into and out of said sampling position, said movement of said containers being synchronized with said movement of said probe-holding means.

9. A structure according to claim 8, including electrical switch means connected between said motor means and a source of electrical potential; and indexing means for closing said switch means at selected intervals, between which said drive means moves said probe means from within said probe-washing means into a container in said sampling position and thence back into said probe-washing means.

10. In an apparatus for moving elongated probe means between first and second horizontally spaced locations, one of which is within an elongated upwardly opening container arranged in a sampling position, the combination comprising:

frame means having rack means for supporting said container in said sampling position, said frame means including upright means near said sampling position;

carriage means supported upon said upright means for vertical movement;

probe-holding means supported on said carriage means for horizontal movement along a substantially straight line with respect to said carriage means;

drive means including first gear means and first linkage means mounted on said frame means and connected to said carriage means for effecting said vertical movement thereof; and second gear means and second linkage means connected between said first linkage means and said probe-holding means for effecting said horizontal movement thereof in synchronism with the vertical movement of said carriage means, said second linkage and second gear means being arranged so that said horizontal movement occurs when said carriage means is near the upper end of its vertical movement, the horizontal and vertical movements of said probe-holding means being substantially coplanar.

11. An apparatus according to claim 10, wherein said second linkage means includes pin means on said probe-holding means and a pair of cams pivotally mounted upon said upright means and engaged with said pin means, said cams having parallel, adjacent and substantially vertical surfaces for guiding the movement of said pin means.

12. An apparatus according to claim 11, wherein said cams have two pairs of parallel surfaces converging upwardly, the pair along which said pin is moving being vertical during such movement.

References Cited

UNITED STATES PATENTS

| | | | |
|---|---|---|---|
| 3,127,773 | 4/1964 | Blumenfeld | 73—423(A) |
| 3,134,263 | 5/1964 | De Jong | 73—423(A) |
| 3,230,776 | 1/1966 | Isreeli et al. | 73—423(A) |
| 3,234,796 | 2/1966 | Leonards | 73—422 |
| 3,252,330 | 5/1966 | Kling | 73—423(A) |
| 3,430,495 | 3/1969 | Burge | 73—423(A) |

LOUIS R. PRINCE, Primary Examiner

HARRY C. POST III, Assistant Examiner

U.S. Cl. X.R.

211—77